United States Patent
Itoga

(10) Patent No.: US 9,761,893 B2
(45) Date of Patent: Sep. 12, 2017

(54) FUEL CELL CASE AND VENTILATION COVER

(71) Applicant: TOYOTA JIDOSHA KABUSHIKI KAISHA, Toyota-shi, Aichi-ken (JP)

(72) Inventor: Michitaro Itoga, Okazaki (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 14/772,955

(22) PCT Filed: Sep. 29, 2014

(86) PCT No.: PCT/JP2014/004975
§ 371 (c)(1),
(2) Date: Sep. 4, 2015

(87) PCT Pub. No.: WO2015/052892
PCT Pub. Date: Apr. 16, 2015

(65) Prior Publication Data
US 2016/0226084 A1  Aug. 4, 2016

(30) Foreign Application Priority Data
Oct. 7, 2013  (JP) .................................. 2013-209865

(51) Int. Cl.
*H01M 8/02*  (2016.01)
*H01M 8/04*  (2016.01)
(Continued)

(52) U.S. Cl.
CPC .............. *H01M 8/04* (2013.01); *H01M 8/02* (2013.01); *H01M 8/04007* (2013.01);
(Continued)

(58) Field of Classification Search
CPC ...... H01M 8/04; H01M 8/02; H01M 8/04007; H01M 8/10; H01M 8/24; H01M 8/2475;
(Continued)

(56) References Cited

U.S. PATENT DOCUMENTS 4,188,862 A * 2/1980 Douglas, III ........... F16K 3/314
251/212
6,497,971 B1 * 12/2002 Reiser ............... H01M 8/04089
429/432
(Continued)

FOREIGN PATENT DOCUMENTS

JP        04048555 A  *  2/1992
JP        07006777 A  *  1/1995
(Continued)

*Primary Examiner* — Gregg Cantelmo
(74) *Attorney, Agent, or Firm* — Finnegan, Henderson, Farabow, Garrett & Dunner, LLP

(57) ABSTRACT

A fuel cell case containing a fuel cell stack includes a side face that has an opening for ventilation; a frame body that is located outside of the case along the periphery of the opening; and a louver that is fixed to inside of the frame body. The louver has a plurality of blades arranged to be separated from one another. The fuel cell case also has a projection that is protruded outward of the case in a predetermined range including at least a region located on a gas blow direction side of the louver in an inner peripheral portion of the frame body. This configuration reduces the likelihood that an elongated material such as wire comes into contact with a high-voltage component relevant to the fuel cell inside of the case.

4 Claims, 7 Drawing Sheets

(51) Int. Cl.
  *H01M 8/24* (2016.01)
  *H01M 8/2475* (2016.01)
  *H01M 8/04007* (2016.01)
  *H01M 8/1018* (2016.01)

(52) U.S. Cl.
  CPC .. *H01M 8/2475* (2013.01); *H01M 2008/1095* (2013.01); *H01M 2250/20* (2013.01); *Y02T 90/32* (2013.01)

(58) Field of Classification Search
  CPC ...... H01M 2008/1095; H01M 2250/20; Y02E 60/50
  See application file for complete search history.

(56) References Cited

U.S. PATENT DOCUMENTS

| | | | |
|---|---|---|---|
| 6,576,361 B1 * | 6/2003 | Barton | H01M 8/02 429/413 |
| 2013/0236805 A1 | 9/2013 | Furuya et al. | |

FOREIGN PATENT DOCUMENTS

| | | | |
|---|---|---|---|
| JP | 2003-229150 | | 8/2003 |
| JP | 2012084639 A | * | 4/2012 |
| JP | 2013-187050 | | 9/2013 |

* cited by examiner

FUEL CELL CASE AND VENTILATION COVER

CROSS-REFERENCE TO RELATED APPLICATIONS

This application is a national phase application of International Application No. PCT/JP2014/004975, filed Sep. 29, 2014, and claims the priority of Japanese Application No. 2013-209865, filed Oct. 7, 2013, the content of both of which is incorporated herein by reference.

TECHNICAL FIELD

The present invention relates to a fuel cell case that contains a fuel cell, as well as to a ventilation cover for the fuel cell case.

BACKGROUND ART

A proposed configuration of a fuel cell case has an opening for ventilation and includes a louver that is located outside of the opening and has a plurality of blades. This configuration prevents invasion of rainwater or the entrance of flying stones or the like into the fuel cell case having an opening for ventilation.

CITATION LIST

Patent Literature

PTL 1: JP 2003-229150A

SUMMARY

Technical Problem

The prior art configuration is, however, not on the assumption that a linear or elongated material such as wire (hereinafter referred to as "elongated material") enters through a clearance of the louver. In such cases, there is a likelihood that the elongated material comes into contact with a high-voltage component relevant to the fuel cell inside of the case. With regard to the fuel cell case, other needs include cost reduction, resource saving and easy manufacture.

Solution to Problem

In order to solve at least part of the problems described above, the invention may be implemented by the following aspects.

(1) According to one aspect of the invention, there is provided a fuel cell case that contains a fuel cell. The fuel cell case may comprise a wall member that has an opening for ventilation; and a ventilation cover that is provided at the opening of the wall member. The ventilation cover may comprise a frame body that is located outside of the case along periphery of the opening; a louver that has a plurality of blades arranged to be separated from one another and is fixed to inside of the frame body; and a projection that is provided to be protruded outward of the case in a predetermined range including at least a region located on a gas blow direction side of the louver in an inner peripheral portion of the frame body. The fuel cell case of this aspect restricts the insertable direction of an elongated material by the direction of the blades of the louver. Additionally, the insertable direction of the elongated material is restricted by the projection that is protruded outward of the case from the inner peripheral portion of the frame body. Accordingly, the fuel cell case of this aspect restricts the insertable direction of the elongated material (for example, wire) to the narrow range. This accordingly has the advantageous effect of reducing the likelihood that an elongated material enters the case from outside and comes into contact with a high-voltage component relevant to the fuel cell inside of the case.

(2) In the fuel cell case of the above aspect, the projection may be protruded from an entire circumference of the inner peripheral portion of the frame body. In this aspect, the projection is provided in the predetermined range including at least the region located on the gas blow direction side of the louver by the simple configuration. This accordingly facilitates manufacture.

(3) The fuel cell case of the above aspect may further comprise a waterproof, gas-permeable membrane that is located in the opening. This configuration prevents invasion of water or any foreign substance into the case, while providing ventilation.

(4) A plurality of the openings and a plurality of the ventilation covers may be provided in one wall member constituting the case, and at least one of the ventilation covers may have the louver arranged in a different direction from a direction of the louver in another ventilation cover.

(5) According to another aspect of the invention, there is provided a ventilation cover that is mounted to a case opening of a fuel cell case containing a fuel cell. The ventilation cover may comprise a frame body that is located outside of the case along periphery of the case opening; and a louver that has a plurality of blades arranged to be separated from one another and is fixed to inside of the frame body. A projection may be provided to be protruded outward of the case in a predetermined range including at least a region located on a gas blow direction side of the louver in an inner peripheral portion of the frame body. Like the fuel cell case of the aspect (1) described above, the ventilation cover of this aspect has the advantageous effect of reducing the likelihood that an elongated material such as wire comes into contact with a high-voltage component relevant to the fuel cell inside of the fuel cell case.

DESCRIPTION OF EMBODIMENTS

The following describes embodiments of the invention.

A. First Embodiment

A-1. General Configuration

Figure 1:
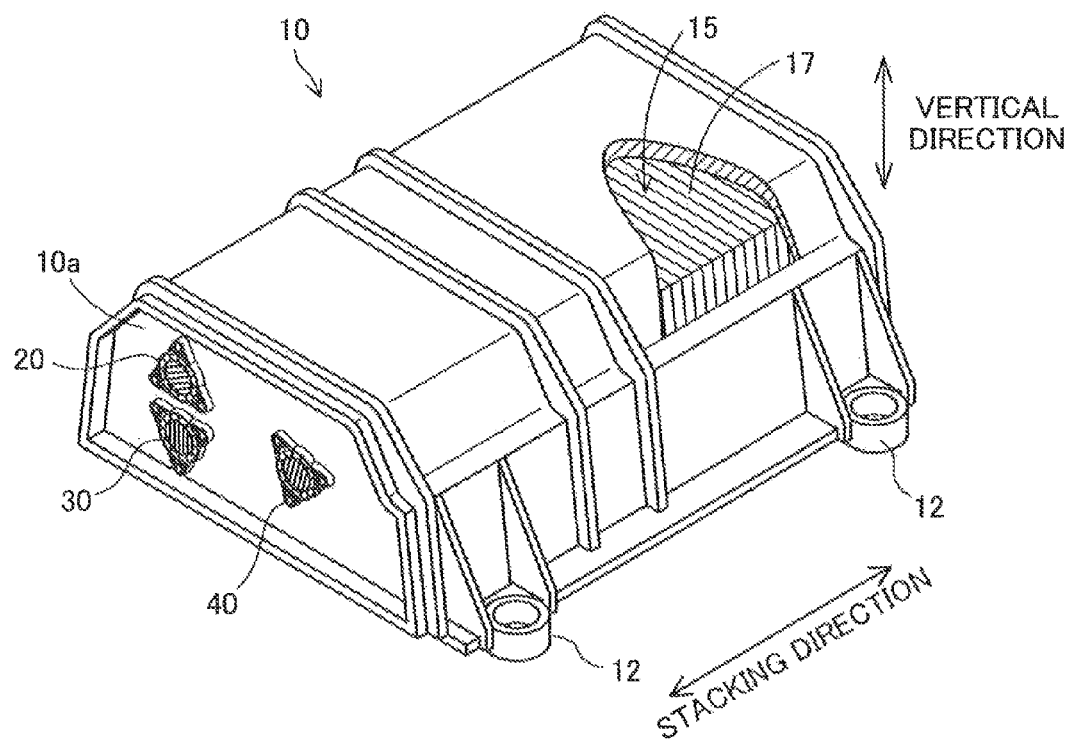
FIG. 1 is a diagram illustrating the general configuration of a fuel cell case according to a first embodiment of the invention.

FIG. 1 is a diagram illustrating the general configuration of a fuel cell case according to a first embodiment of the invention. In the illustration of FIG. 1, the outer shell of the fuel cell case is partly cut away. This fuel cell case 10 is a case that contains a fuel cell stack 15 and is placed below the floor of a fuel cell vehicle. The fuel cell stack 15 is provided as a cell stack in which a plurality of fuel cell units (power generation cells as minimum power generation units) 17 are stacked and is, for example, a polymer electrolyte type. Each power generation cell 17 generates electricity using a fuel gas supplied from a fuel gas tank (not shown) mounted on the fuel cell vehicle and the air supplied as an oxidizing gas from the environment around the fuel cell vehicle. According to this embodiment, hydrogen gas is employed as the fuel gas. The fuel cell case 10 is roughly in a rectangular parallelepiped shape and contains the fuel cell stack 15 such an arrangement that a longitudinal direction of the rectangular parallelepiped is aligned with the stacking direction of the plurality of power generation cells 17. The fuel cell case 10 is a metal (for example, aluminum) cast.

The fuel cell case 10 is fixed on a stack frame (not shown) coupled with a vehicle body. According to this embodiment, the fuel cell case 10 is fixed to the stack frame by inserting bolts through mounting structures 12 and fastening the bolts to the stack frame.

First, second and third ventilation covers 20, 30 and 40 are mounted to one side face 10a perpendicular to the stacking direction out of four side faces of the fuel cell case 10. The side face 10a is a wall member stood along a vertical direction of the vehicle. The first to the third ventilation covers 20, 30, and 40 are arranged to cover three case openings for ventilation formed in the fuel cell case 10 as described later.

A-2. Configuration of Ventilation Cover

Figure 2:
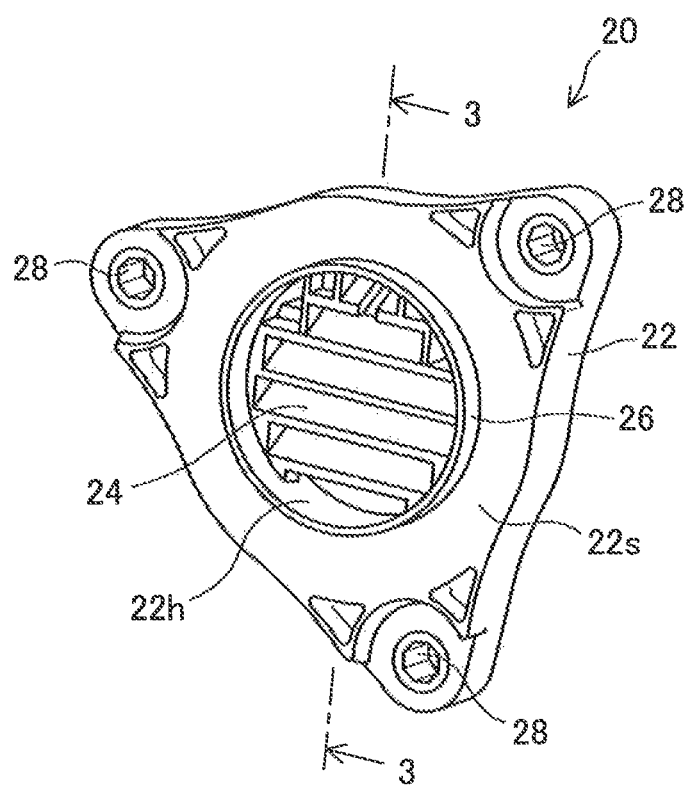
FIG. 2 is a perspective view illustrating the configuration of a ventilation cover.
Figure 3:
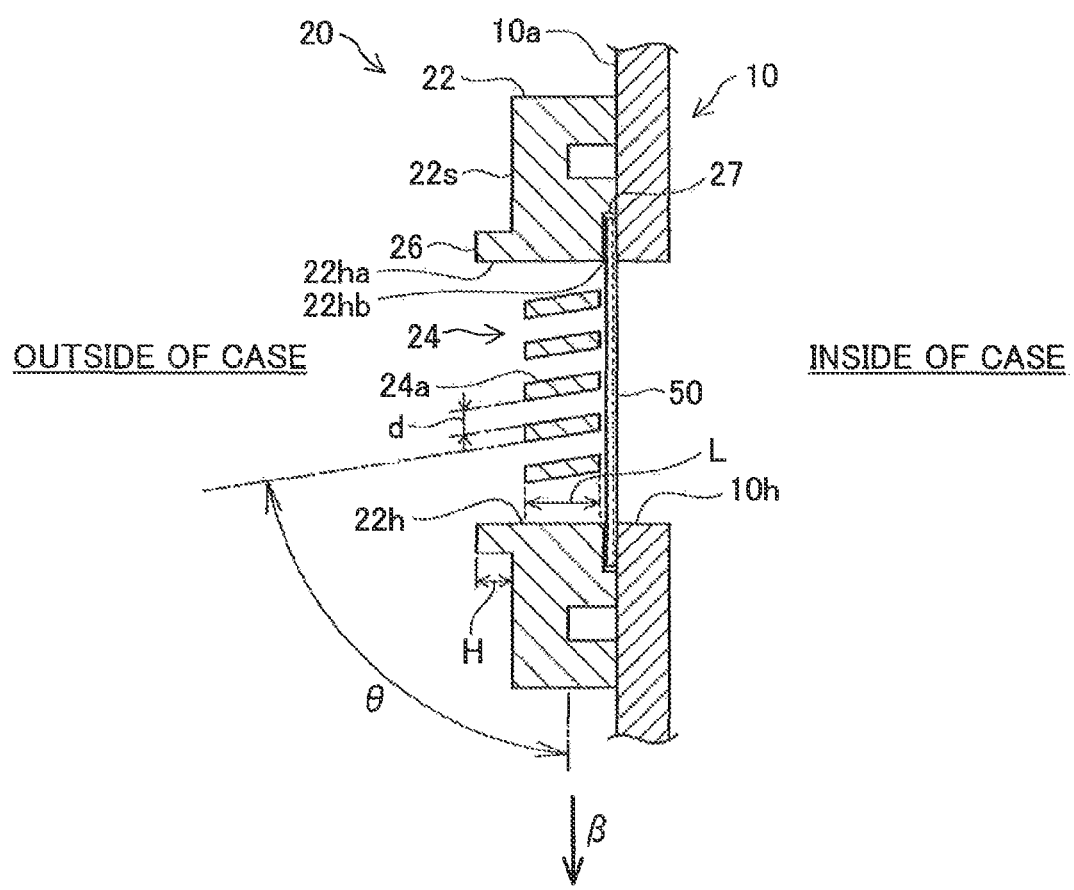
FIG. 3 is a diagram illustrating an aspect of mounting the ventilation cover to the fuel cell case.

FIG. 2 is a perspective view illustrating the configuration of the ventilation cover 20, and FIG. 3 is a diagram illustrating an aspect of mounting the ventilation cover to the fuel cell case. The first to the third ventilation covers 20, 30, and 40 have an identical configuration, so that the following describes the first ventilation cover 20 as a representative example. In the description as the representative example, the first ventilation cover 20 is simply called "ventilation cover 20". The ventilation cover 20 of FIG. 3 is illustrated in a sectional view taken in the direction of an arrow 3-3 in FIG. 2. FIG. 3 is a sectional view taken on a plane perpendicular to blades 24a of a louver 24 described later. As shown in FIG. 2, the ventilation cover 20 is an integral molded product including a frame body 22 and the louver 24 and is made of a resin. The frame body 22 is roughly in a triangular outer shape in plan view and has a circular opening 22h at the center. The louver 24 is provided inside of this opening 22h.

Figure 4:
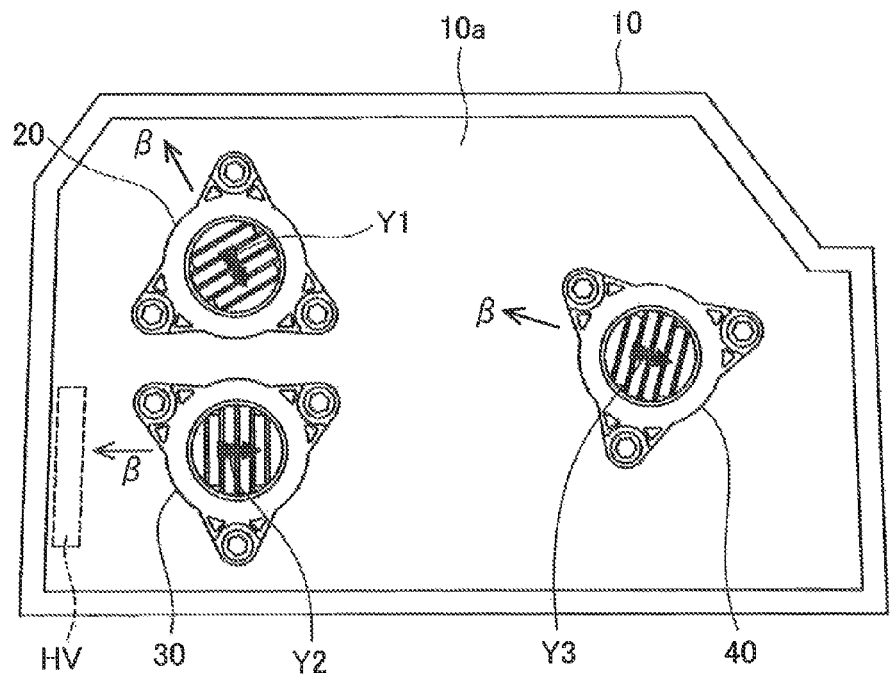
FIG. 4 is a diagram illustrating a side face of the fuel cell case.

As shown in FIGS. 2 and 3, the louver 24 has a plurality of blades 24a in a long plate-like shape arranged parallel to one another at intervals d. According to this embodiment, the louver 24 has five blades 24a. The louver 24 may have any plural number of blades 24a. The louver 24 is provided inside of the opening 22h of the frame body 22. The blades 24a are arranged at an angle θ suitable for not interfering with a gas flow through the opening 22h and for effectively preventing invasion of foreign substances. The angle θ of the blades 24a denotes the magnitude of an angle between an air inflow direction relative to the blades 24a (direction of length or shorter width in this embodiment) and an array direction of the blades 24a and is defined as a value of equal to or less than 90 degrees. According to this embodiment, the angle θ of the blades 24a is 80 degrees. With regard to the array direction of the blades 24a, a direction as the basis of the angle θ or more specifically downward direction in FIG. 3 is hereinafter referred to as direction β of the ventilation cover. FIG. 4 shows a difference of the directions β of the respective ventilation covers 20, 30, and 40. The interval d between adjacent blades 24a is any value in the range of 1 mm to 5 mm. The interval d is set to be equal to or less than 5 mm, in order to prevent the entrance of flying stones or the like.

The opening 22h of the frame body 22 defines the inside of the frame body 22. A projection 26 protruded outward of the case is provided at an end (more specifically, inner peripheral portion) 22ha inside of the frame body 22 on one surface 22s-side of the frame body 22. The projection 26 is formed in a circular shape along the circumference of the opening 22h. A groove 27 is formed at an opposite end 22ha to the projection 26 inside of the frame body 22. The groove 27 is formed in a circular shape along the circumference of the opening 22h. A waterproof, gas-permeable membrane 50 is provided in the groove 27 to cover the opening 22h. The waterproof gas-permeable membrane 50 is a membrane that allows for permeation of a gas but prohibits permeation of a liquid and is made of a resin. The waterproof, gas-permeable membrane 50 has a structure of; for example, woven fabric, unwoven fabric, mesh or net. According to this embodiment, the waterproof, gas-permeable membrane 50 is made of Teflon (registered trademark). The waterproof, gas-permeable membrane 50 is thermally welded to the groove 27 of the resin frame body 22.

As shown in FIG. 3, a case opening 10h is formed in the side face 10a of the fuel cell case 10 described above to have substantially the same shape and the same dimensions as those of the opening 22h of the ventilation cover 20. The ventilation cover 20 is mounted to the side face 10a of the fuel cell case 10, such that the case opening 10h is connected with the opening 22h of the ventilation cover 20. The ventilation cover 20 is mounted by means of bolts (not shown) inserted and screwed to mounting holes 28 (shown in FIG. 2) provided at three different positions along the outer periphery of the ventilation cover 20. The mounting direction is determined such that the projection 26 faces outside of the fuel cell case 10. The case opening 10h corresponds to the "opening" described in Summary.

FIG. 4 is a diagram illustrating the side face 10a of the fuel cell case 10. The first ventilation cover 20 shown in FIGS. 2 and 3, the second ventilation cover 30 and the third ventilation cover 40 are provided on the side face 10a of the fuel cell case 10 described above. The first to the third ventilation covers 20, 30, and 40 have the same configurations but have different mounting directions. More specifically, the first to the third ventilation covers 20, 30, and 40 are respectively mounted in different directions β as illustrated.

According to this embodiment, a high-voltage component HV connected with the fuel cell stack 10 contained in the fuel cell case 10 is placed on a lower left side of the drawing in the plan view. The second ventilation cover 30 provided at a position near to this high-voltage component HV is mounted such that the mounting direction β of the ventilation cover is the direction of the high-voltage component HV (direction from the right side toward the left side in the drawing). This arrangement causes the insertable insertion direction from outside of the case toward inside of the case to be a reverse direction to the mounting direction β (direction of arrow Y2 in the drawing) with regard to the intervals of blades of the second ventilation cover 30. This restricts the insertable direction of an elongated material such as wire to the direction of arrow Y2 and reduces the likelihood that the elongated material reaches the high-voltage component HV. The insertable direction of an elongated material with regard to the first ventilation cover 20 is restricted to a direction of arrow Y1, and the insertable direction of an elongated material with regard to the third ventilation cover 40 is restricted to a direction of arrow Y3. Arranging the first to the third ventilation covers 20, 30, and 40 respectively in the difference directions in this manner reduces the likelihood that an elongated material reaches a specific region (high-voltage component HV in this embodiment) with regard to the entire fuel cell case.

A-3. Functions and Advantageous Effects

Providing the fuel cell case 10 to cover over the fuel cell stack 15 causes the hydrogen gas concentration in the case to increase to some extent due to permeation of hydrogen in sealing portions of the fuel cell stack 15. According to this embodiment, providing the first to the third ventilation covers 20, 30, and 40 in the case opening 10h of the fuel cell case 10 controls the hydrogen concentration in the case to be equal to or lower than a predetermined reference value, while ensuring sufficient ventilation capacity. Providing the waterproof, gas-permeable membrane 50 (shown in FIG. 3) at the end inside of the fuel cell case 10 of each of the ventilation covers 20, 30, and 40 prevents invasion of water into the case, while ensuring ventilation. Additionally, in the fuel cell case 10 of the first embodiment, the louver 24 provided in the ventilation cover 20 blocks the entrance of an elongated material. This reduces the likelihood that an elongated material such as wire enters from outside, even when the waterproof, gas-permeable membrane 50 has low strength.

Figure 5:
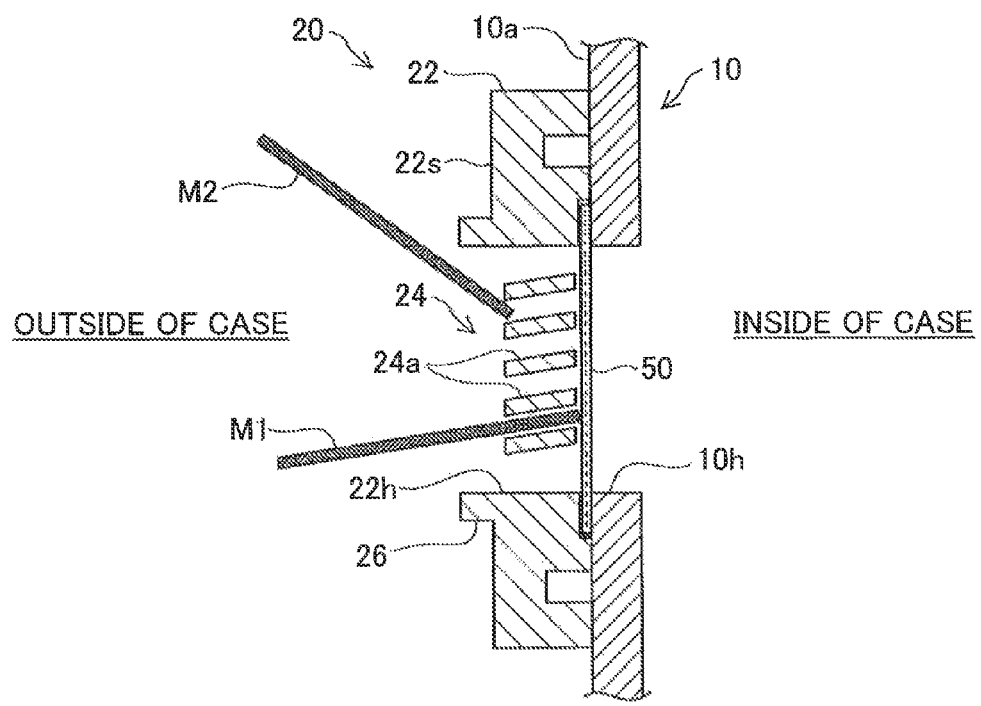
FIG. 5 is a diagram illustrating a state that a louver blocks the entrance of an elongated material.

FIG. 5 is a diagram illustrating a state that the louver 24 blocks the entrance of an elongated material. With regard to an elongated material M1 having the insertion direction that is coincident with the gas flow direction from the blades 24a, the blades 24a cannot block the entrance of the elongated material M1 into the case. With regard to an elongated material M2 having the illustrated insertion direction, on the other hand, the elongated material M2 hits against the blade 24a, so that the blades 24a blocks the entrance of the elongated material M2 into the case. The likelihood of blocking the entrance depends on the angle θ of the blades 24a and the position (depth) of the blades 24a inside of the opening 22h and the case opening 10h. When the blades 24a are provided at a fixed inner position, the smaller angle θ increases the likelihood of blocking the entrance. Increasing the thickness of the ventilation cover or the stack case, however, leads to the size expansion of the overall configuration, and decreasing the angle θ of the louver 24 increases the pressure loss and deteriorates the ventilation capacity. In the fuel cell case 10 of the first embodiment, projection 26 is provided in the frame body 22 of the louver 24, in addition to the above structure. This expands the range of blocking the entrance of an elongated material, while avoiding size expansion of the device configuration and ensuring the sufficient ventilation capacity.

Figure 6:
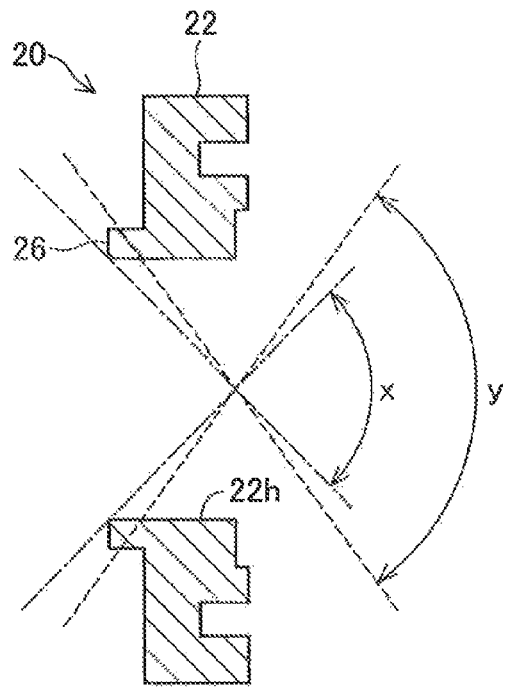
FIG. 6 is a diagram illustrating the functions of a projection of the ventilation cover.

FIG. 6 is a diagram illustrating the functions of the projection 26 of the ventilation cover 20. Protrusion of the projection 26 from the opening 22h of the frame body 22 causes the blades 24a to be arranged at the inner position relative to the opening. The projection 26 restricts the insertable range of an elongated material to a range x. In a configuration without the projection 26, on the other hand, the insertable range of an elongated material is a range y. Since the range y is narrower than the range x, the configuration with the projection 26 expands the range of blocking or suppressing the entrance of an elongated material, compared with the configuration without the projection 26. Accordingly, the fuel cell case 10 of the first embodiment has the relatively large angle θ (80 degrees in this embodiment) of the louver 24 to ensure sufficient ventilation, but has the projection 26 provided in the ventilation cover 20 to restrict the insertable range of an elongated material to the narrower range. This advantageously reduces the likelihood that an elongated material enters the case and comes into contact with a high-voltage component i-TV relevant to the fuel cell. Additionally, the fuel cell case 10 restricts the insertable direction of an elongated material by the angle of the blades 24a. Adequately selecting the mounting directions of the ventilation covers 20, 30, and 40 shortens the distance required between the opening 10h of the fuel cell case 10 and the high-voltage component HV and provides the additional effect of suppressing an increase in overall size of the fuel cell case 10.

According to this embodiment, the opening 22h of the ventilation cover 20 is formed in a circular shape. This provides the additional effect that heat is likely to be transferred uniformly and thereby enables the waterproof, gas-permeable membrane 50 to be evenly thermally welded to the frame body 22. In other words, an opening formed in a rectangular shape is likely to cause heat to be concentrated at the corners and thereby lead to uneven welding, while this embodiment ensures even welding.

According to this embodiment, the angle θ of the louver 24 is 80 degrees. The angle θ of the blades 24a of the louver 24 may, however, be angle value in the range of 30 degrees to 80 degrees. A decrease in angle θ increases the likelihood of blocking the entrance of an elongated material, while increasing the pressure loss and deteriorating the ventilation capacity. Controlling the angle θ to 30 degrees to 80 degrees achieves the good balance between increasing the likelihood of blocking the entrance of an elongated material and ensuring the ventilation capacity.

The smaller angle θ causes another problem of low productivity, in addition to the increased pressure loss. By taking into account removal from a casting mold in manufacture of the ventilation cover 20, it is preferable that a rear end position P2 of a lower blade 24a (shown in FIG. 7A) is located at the same height of or below in the vertical direction a front end position P1 of a blade 24a in the louver 24 (shown in FIG. 7A). In this state, the excessively small angle θ of the louver 24 requires to decrease the number of blades 24a, in order to locate the blades 24a in the opening 22h of the frame body 22. Due to the opening 22h formed in the circular shape and the small angle of the blades 24a, there is a need to process the blades 24a to adjust the respective ends of the blades 24a along the opening 22h. This results in decreasing the productivity. By taking into account this problem, it is preferable to set the angle θ of the louver 24 to be equal to or greater than 30 degrees.

Figure 7A:
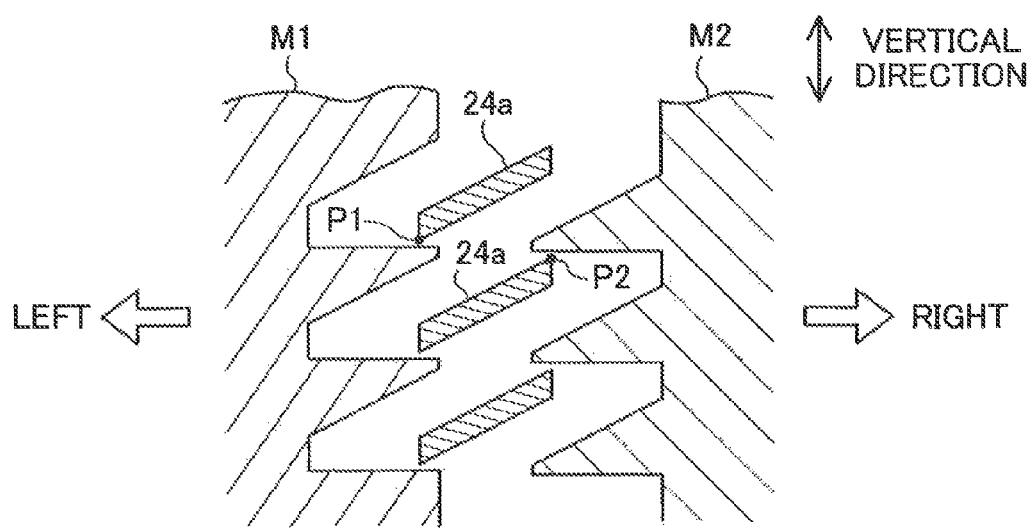
FIG. 7A is a diagram illustrating that removal from a casting mold is allowed in the course of manufacture.
Figure 7B:
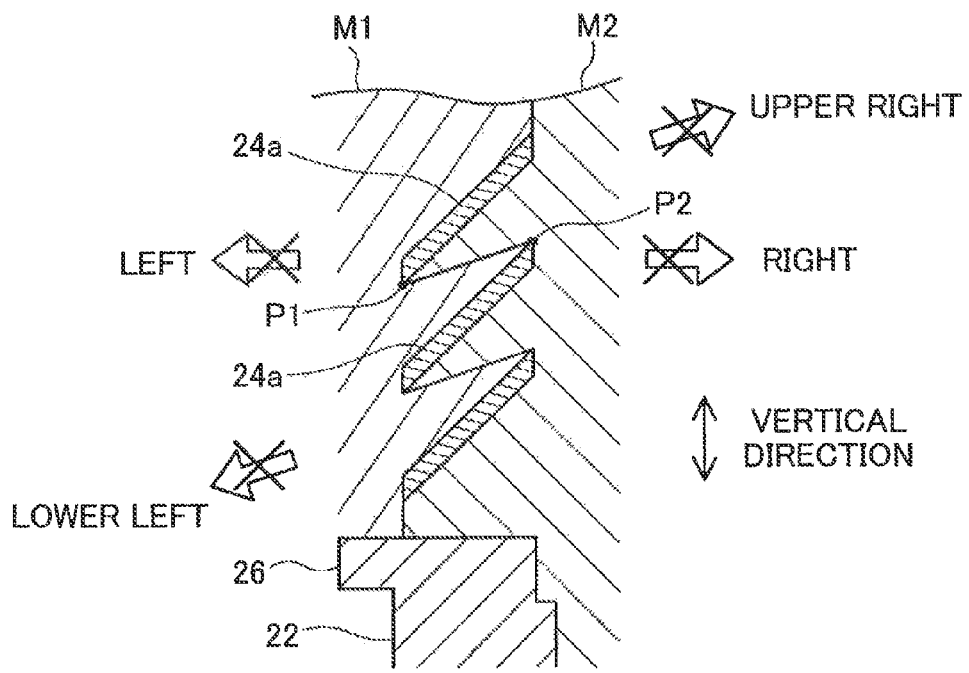
FIG. 7B is a diagram illustrating a difficulty in removal from the casting mold in the course of manufacture.

FIGS. 7A and 7B are diagrams illustrating a difficulty in removal from a casting mold in the course of manufacture. As shown in FIG. 7A, when the rear end position P2 of a lower blade 24a is located at the same height of or below in the vertical direction the front end position P1 of a blade 24a, left-side and right-side molds M1 and M2 are respectively opened leftward and rightward to allow for easy removal from the molds. As shown in FIG. 7B, on the other hand, when the rear end position P2 of a lower blade 24a is located above in the vertical direction the front end position P1 of a blade 24a in the louver 24, the molds M1 and M2 cannot be opened respectively leftward and rightward. This leads to a failure in removal from the molds. In FIG. 7B, the cross mark written over each arrow indicates that removal from the mold in the direction of arrow is not allowed. In a configuration that the blades 24a are not located at the inner position relative to the opening 22h of the ventilation cover 20, the molds M1 and M2 may be respectively opened obliquely downward to the left and obliquely upward to the right to allow for removal from the molds. In the configuration of the embodiment that provides the projection 26 and has the blades 24a located at the inner position relative to the opening 22h, however, the molds M1 and M2 are stuck by the projection 26 or the like, so that opening the molds M1 and M2 obliquely downward to the left and obliquely upward to the right does not allow for removal from the molds. Accordingly, by taking into account removal from the casting mold in manufacture of the ventilation cover 20, the preferable positional relationship between P1 and P2 is that the rear end position P2 of a lower blade 24a is located at the same height of or below in the vertical direction the front end position P1 of a blade 24a.

In addition to controlling the angle θ of the louver 24 to the range of 30 degrees to 80 degrees by taking into account the ventilation performance and the productivity, it is also preferable to further specify the inclination of the louver 24 by the following angle α and determine the range of the angle θ of the louver 24.

Figure 8:
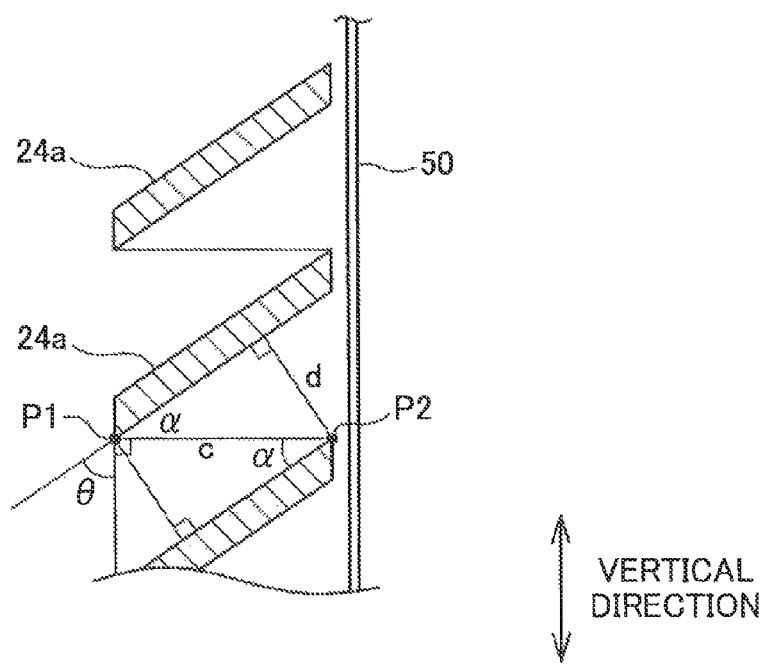
FIG. 8 is a diagram illustrating another mode of specifying the inclination of the louver.

FIG. 8 is a diagram illustrating another mode of specifying the inclination of the louver. As illustrated, the relationship following Equation (1) given below is satisfied, where c represents distance between the front end position P1 and the rear end position of the blades 24a, d represents distance (=interval) between adjacent blades 24a and α represents angle between a line segment of connecting P1 with P2 and the surface of the blades 24a. Equation (1) is written as Equation (2):

$$\sin \alpha = d/c \quad (1)$$

$$\alpha = \sin^{-1}(d/c) \quad (2)$$

The distance d is 1 to 5 mm as described above. The distance c is a predetermined value (for example, 7 mm) determined according to the thickness of the ventilation cover 20. The angle α is given by Equation (3) below when the distance d is the lower limit value of 1 mm, while being given by Equation (4) below when the distance d is the upper limit value of 5 mm:

$$\alpha = \sin^{-1}(1/c) \quad (3)$$

$$\alpha = \sin^{-1}(5/c) \quad (4)$$

The angle α between the line segment of connecting P1 with P2 and the surface of the blades 24a is accordingly in the range of $\sin^{-1}(1/c)$ to $\sin^{-1}(d/c)$. Controlling the angle α to this range prevents the entrance of flying stones or the like. The relationship between the angle θ of the louver 24 and the above angle α described in the first embodiment is given as Equation (5) given below, when P1 and P2 are located at the same height in the vertical direction:

$$\theta = 90° - \alpha \quad (5)$$

B. Second Embodiment

Figure 9:
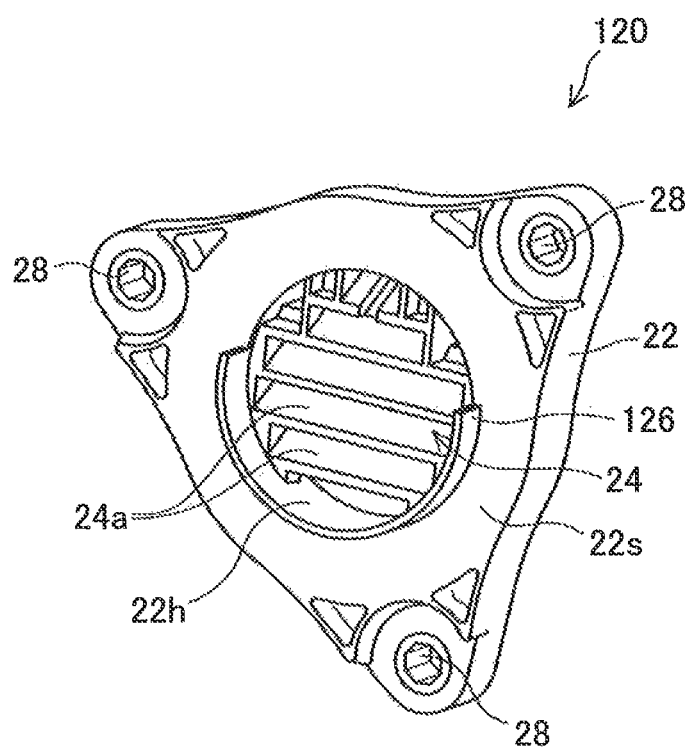
FIG. 9 is a perspective view illustrating a ventilation cover provided on a fuel cell case according to a second embodiment of the invention.

FIG. 9 is a perspective view illustrating a ventilation cover provided on a fuel cell case according to a second embodiment of the invention. A ventilation cover 120 of the second embodiment differs from the ventilation cover 20 of the first embodiment by the shape of a projection 126. The other configuration of the ventilation cover 120 of the second embodiment is similar to the configuration of the ventilation cover 20 of the first embodiment, so that the like components in FIG. 6 are shown by the like signs to those of FIG. 2 and are not specifically described here.

As shown in FIG. 2, the projection 26 is provided along the entire circumference of the inner peripheral portion 22ha in the opening 22h of the frame body 22 according to the first embodiment. Alternatively, according to the second embodiment, the projection 126 is provided along half the circumference of the opening 22h of the frame body 22. Half the circumference herein means a semicircle located on the gas blow direction side (lower side in FIG. 6) from the louver 24 outside of the case out of two semicircles obtained by dividing the entire circumference of the opening 22h into two halves by a line parallel to the width (longer width) of the blades 24a. The projection 126 is provided along this semicircle according to the second embodiment. This semicircle corresponds to the "region located on the gas blow direction side of the louver" described in Summary.

The fuel cell case of the second embodiment having the above configuration has the projection 126 in the semicircular shape. Compared with the configuration of the first embodiment, this configuration allows for insertion of an elongated material along a cutout portion of the projection, but the inserted elongated material hits against a blade 24a. This accordingly blocks the entrance of an elongated material into the case. Like the fuel cell case of the first embodiment, the fuel cell case of the second embodiment reduces the likelihood that an elongated material enters the case and comes into contact with a high-voltage component relevant to the fuel cell and also suppresses an increase in size of the fuel cell case.

C. Modifications

Modification 1

The projection 26 is provided along the entire circumference of the opening 22h of the frame body 22 in the first embodiment, and the projection 126 is provided along half the circumference of the opening 22h of the frame body 22 in the second embodiment. The invention is, however, not limited to these configurations. The projection may be provided along any range including at least the semicircle of the second embodiment. The projection may not be necessarily in the circular shape, but spot-like projections may be arrayed at predetermined intervals. In the latter case, it is preferable to set this interval to be less than the diameter of an expected elongated material. The projection 26 or 126 may be formed separately from the frame body 22 and may be retrofitted to the frame body 22.

Modification 2

In the respective embodiments described above, the ventilation cover is fixed to the fuel cell case by bolts. Another technique such as rivets or an adhesive may be employed for fixation. The ventilation cover may not be provided separately from the fuel cell case but may be integrated with the fuel cell case.

Modification 3

In the respective embodiments and modifications described above, the fuel cell is the polymer electrolyte fuel cell. The invention may be applicable to various fuel cells, such as phosphoric acid fuel cell, molten carbonate fuel cell and solid oxide fuel cell.

The invention is not limited to any of the embodiments and the modifications described above but may be implemented by a diversity of other configurations without departing from the scope of the invention. For example, the technical features of any of the embodiments and modifications corresponding to the technical features of the respective aspects described in Summary may be replaced or combined appropriately, in order to solve part or all of the problems described above or in order to achieve part or all of the advantageous effects described above. Components other than those described in independent claims among components of any of the above embodiments and modifications are additional components and may be omitted appropriately.

The invention is applicable to the fuel cell case that contains the fuel cell, as well as to the ventilation cover.

REFERENCE SIGNS LIST 10 fuel cell case
10a side face
10h case opening
12 mounting structure
15 fuel cell stack
17 power generation cell
20 first ventilation cover
22 frame body
22h opening
22s surface
24 louver
24a blade
26 projection
27 slit
28 mounting hole
30 second ventilation cover
40 third ventilation cover
50 waterproof gas-permeable membrane
120 ventilation cover
126 projection
M1 elongated material
M2 elongated material
HV high voltage component

The invention claimed is:

1. A fuel cell case that contains a fuel cell, the fuel cell case comprising
a wall member that has an opening for ventilation;
a ventilation cover that is provided at the opening of the wall member; and
a waterproof, gas-permeable membrane that is provided in the opening, wherein the ventilation cover comprises:
a frame body that is located outside of the case along periphery of the opening;
a louver that has a plurality of blades arranged to be separated from one another and is fixed to inside of the frame body; and
a projection that is provided to be protruded outward of the case in a predetermined range including at least a region located on a gas blow direction side of the louver in an inner peripheral portion of the frame body, and wherein:
the projection is protruded from an entire circumference of the inner peripheral portion of the frame body, and
a plurality of openings and a plurality of ventilation covers are provided in one wall member constituting the case, and at least one of the ventilation covers has the louver arranged in a different direction from a direction of the louver in another ventilation cover.

2. A fuel cell case that contains a fuel cell, the fuel cell case comprising
a wall member that has an opening for ventilation; and
a ventilation cover that is provided at the opening of the wall member, wherein the ventilation cover comprises:
a frame body that is located outside of the case along periphery of the opening;
a louver that has a plurality of blades arranged to be separated from one another and is fixed to inside of the frame body; and
a projection that is provided to be protruded outward of the case in a predetermined range including at least a region located on a gas blow direction side of the louver in an inner peripheral portion of the frame body, and wherein:
the projection is protruded from an entire circumference of the inner peripheral portion of the frame body, and
a plurality of openings and a plurality of ventilation covers are provided in one wall member constituting the case, and at least one of the ventilation covers has the louver arranged in a different direction from a direction of the louver in another ventilation cover.

3. A fuel cell case that contains a fuel cell, the fuel cell case comprising
a wall member that has an opening for ventilation;
a ventilation cover that is provided at the opening of the wall member; and
a waterproof, gas-permeable membrane that is provided in the opening, wherein the ventilation cover comprises:
a frame body that is located outside of the case along periphery of the opening;
a louver that has a plurality of blades arranged to be separated from one another and is fixed to inside of the frame body; and
a projection that is provided to be protruded outward of the case in a predetermined range including at least a region located on a gas blow direction side of the louver in an inner peripheral portion of the frame body, and wherein a plurality of openings and a plurality of ventilation covers are provided in one wall member constituting the case, and at least one of the ventilation covers has the louver arranged in a different direction from a direction of the louver in another ventilation cover.

4. A fuel cell case that contains a fuel cell, the fuel cell case comprising
a wall member that has an opening for ventilation; and
a ventilation cover that is provided at the opening of the wall member, wherein the ventilation cover comprises:

a frame body that is located outside of the case along periphery of the opening;
a louver that has a plurality of blades arranged to be separated from one another and is fixed to inside of the frame body; and
a projection that is provided to be protruded outward of the case in a predetermined range including at least a region located on a gas blow direction side of the louver in an inner peripheral portion of the frame body, and
wherein a plurality of openings and a plurality of ventilation covers are provided in one wall member constituting the case, and at least one of the ventilation covers has the louver arranged in a different direction from a direction of the louver in another ventilation cover.

* * * * *